United States Patent [19]

Robeson et al.

[11] 4,443,581
[45] Apr. 17, 1984

[54] IMPACT MODIFIED POLYARYLATE BLENDS

[75] Inventors: Lloyd M. Robeson, Whitehouse Station; Markus Matzner, Edison, both of N.J.

[73] Assignee: Union Carbide Corporation, Danbury, Conn.

[21] Appl. No.: 296,870

[22] Filed: Aug. 27, 1981

[51] Int. Cl.³ .................... C08L 67/02; C08L 83/06; C08L 69/00
[52] U.S. Cl. ..................................... 525/92; 525/101; 525/439; 525/446; 525/474
[58] Field of Search ................. 525/439, 446, 474, 92, 525/101

[56] References Cited

U.S. PATENT DOCUMENTS

| | | | |
|---|---|---|---|
| 3,536,657 | 10/1970 | Noshay et al. | 525/474 |
| 3,792,115 | 2/1974 | Kishikawa et al. | 525/439 |
| 4,161,469 | 7/1979 | LeGrand et al. | 525/439 |
| 4,231,922 | 11/1980 | Robeson | 525/68 |
| 4,259,458 | 3/1981 | Robeson | 525/439 |

*Primary Examiner*—Wilbert J. Briggs, Sr.
*Attorney, Agent, or Firm*—Donald M. Papuga

[57] ABSTRACT

Described herein are polyarylate molding compositions having improved notched izod impact values after molding, which composition comprises a blend of a polyarylate and a siloxane-polyarylene polyether block copolymer and/or a siloxane polycarbonate block copolymer.

19 Claims, No Drawings

IMPACT MODIFIED POLYARYLATE BLENDS

This invention is directed to a polyarylate molding composition having improved notched izod impact values after molding. The impact modified polyarylate composition of this invention comprises a blend of a polyarylate derived from a dihydric phenol and an aromatic dicarboxylic acid and a siloxane-polyarylene polyether block copolymer and/or a siloxane-polycarbonate block copolymer. The blend may also contain a polyester.

Polyarylates are aromatic polyesters derived from a dihydric phenol, particularly 2,2-bis-(4-hydroxyphenyl)propane (also identified as Bisphenol-A) and an aromatic dicarboxylic acid, particularly mixtures of terephthalic and isophthalic acids.

Polyarylates are high temperature, high performance thermoplastic polymers with a good combination of thermal and mechanical properties. They have a high continuous use temperature of about 130° C., and good unnotched touchness, with a pendulum impact value of greater than 300 ft. lbs./in$^3$. Additionally, polyarylates have inherent flammability and combustion resistance as well as good weatherability. The polyarylates have good melt stability at high temperatures and good color retention. They also have good processability which allows them to be molded into a variety of articles.

In terms of their thermal and mechanical properties, polyarylates are comparable to other high performance thermoplastic polymers, such as polycarbonates. However, while polyarylates have excellent unnotched izod impact values (no-break), their notched izod impact values are considerably lower than those of polycarbonates, which have a notched izod impact value of about 16 ft. lbs./in. of notch. Thus, it is desirable to increase the notched izod impact values of polyarylate compositions, without essentially effecting the other mechanical properties of the polyarylates so that they can be used in applications where high notched izod impact values are necessary.

The impact properties of polymers have been increased by the addition of impact modifiers. A wide variety of impact modifiers, based on rubbers of polybutadiene, butadiene-styrene copolymers, etc., as well as hydrocarbon based elastomers have been suggested as additives to thermoplastic polymers to increase their impact properties in general. V. Shahajpal, in "Developments in PVC Technology" edited by J. H. L. Henson and A. Whelan, Applied Science Publishers Ltd., New York, 1973, describes the use of impact modifiers which include graft copolymers of vinyl aromatics, acrylates and acrylonitriles grafted onto an unsaturated elastomeric backbone to increase the impact properties of poly(vinyl chloride). However, in comparison to polymers such as poly(vinyl chloride), polyarylates have a high molding temperature (>330° C.) so that most impact modifiers, including the butadiene based elastomers, as described in said reference, degrade when processed at these high molding temperatures.

Accordingly, such impact modifiers are not suitable for use in unmodified polyarylates.

It has now been found that the notched izod impact values of polyarylate molding compositions can be increased by blending the polyarylate with a siloxane-polyarylene polyether block copolymer and/or a siloxane-polycarbonate block copolymer.

THE INVENTION

This invention is directed to a polyarylate molding composition having improved notched izod impact values after molding, which composition comprises in admixture:
(a) a polyarylate derived from a dihydric phenol and an aromatic dicarboxylic acid; and
(b) a siloxane-polyarylene polyether block copolymer and/or a siloxane polycarbonate block copolymer.

A preferred polyarylate molding composition comprises in admixture:
(a) a polyarylate derived from a dihydric phenol and an aromatic dicarboxylic acid;
(b) a polyester derived from an aliphatic or cycloaliphatic diol, or mixtures thereof, and an aromatic dicarboxylic acid; and
(c) a siloxane-polyarylene polyether block copolymer and/or a siloxane-polycarbonate block copolymer.

POLYARYLATES

The polyarylates of this invention are derived from a dihydric phenol and an aromatic dicarboxylic acid.

A particularly desirable dihydric phenol is of the following formula:

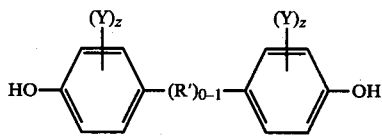

wherein Y is selected from alkyl groups of 1 to 4 carbon atoms, chlorine or bromine, z has a value of from 0 to 4, inclusive, and R' is a divalent saturated aliphatic hydrocarbon radical, particularly alkylene and alkylidene radicals having from 1 to 3 carbon atoms, and cycloalkylene radicals having up to and including 9 carbon atoms. The preferred dihydric phenol is bisphenol-A. The dihydric phenols may be used individually or in combination.

Additionally, said dihydric phenols can be used in combination with a dihydric phenol of the following formula:

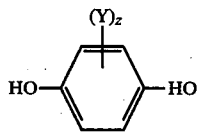

wherein Y and z are as previously defined.

Suitable aromatic dicarboxylic acids include terephthalic acid, isophthalic acid, naphthalene dicarboxylic acids, and mixtures thereof, as well as alkyl substituted homologs of these carboxylic acids wherein the alkyl groups contain from 1 to about 4 carbon atoms, and acids containing other inert substituents such as halides, alkyl or aryl ethers, and the like.

Preferably, the polyarylates contain from about 95 to 0 mole percent of terephthalic acid and from about 5 to 100 mole percent of isophthalic acid. More preferably, the polyarylates contain a mixture of from about 30 to about 70 mole percent of terephthalic acid and from about 70 to about 30 mole percent of isophthalic acid. A polyarylate containing a mixture of 50 mole percent of terephthalic acid and 50 mole percent of isophthalic acid is most preferred.

The polyarylates of the present invention can be prepared by any of the well known prior art polyester forming reactions, such as the reaction of the acid chlorides of the aromatic dicarboxylic acids with the dihydric phenol, the reaction of the diaryl esters of the aromatic dicarboxylic acids with the dihydric phenols, and the reaction of the aromatic diacids with diester derivatives of the dihydric phenol. These processes are described in, for example, U.S. Pat. Nos. 3,317,464; 3,948,856; 3,780,148; 3,824,213 and 3,133,898.

These polyarylates have a reduced viscosity of from about 0.4 to about 1.0 as measured in p-chlorophenol at 49° C. (0.2 g/100 ml.).

SILOXANE-POLYARYLENE POLYETHER BLOCK COPOLYMER

The siloxane-polyarylene polyether block copolymers are known in the art and are described in, for example, U.S. Pat. No. 3,539,657.

The siloxane-polyarylene polyether block copolymers comprise (A) at least one siloxane chain having at least two siloxane units represented by the formula:

wherein R is a monovalent hydrocarbon group, a divalent organic group or ether group (—O—) and b has a value from 1 to 3 inclusive, and (B) at least one linear thermoplastic polyarylene polyether chain comprised of recurring units having the formula:

$$-O-E-O-E'-\qquad (II)$$

wherein E is the residuum of a dihydric phenol and E' is the residuum of a benzenoid compound having an inert electron withdrawing group ortho or para to the valence bond, both of said residua being valently bonded to the ether oxygens through aromatic carbon atoms. The siloxane chain and the polyarylene polyether chains are linked by a carbon bond where $R_1$ is a divalent organic group or by an aryloxy to silicon bond when $R_1$ is ether oxygen and each has a molecular weight such that the copolymer is a two phase polymeric material.

The copolymers contain from 10 to 90 percent by weight of siloxane and from 90 to 10 percent by weight of polyarylene polyether.

The preferred copolymers are linear. The preferred elastomeric copolymers contain at least 50 percent siloxane and each chain of the copolymer has a molecular weight in the range of about 5000 to about 20,000.

As stated above the copolymers contain siloxane chains having at least two siloxane units represented by the formula:

wherein $R_1$ is a monovalent hydrocarbon group, a divalent organic group (e.g. a divalent hydrocarbon group, a hydroxy-substituted divalent hydrocarbon group or a divalent hydrocarbon group linked to a carbonyl group) or ether oxygen (—O—) and b has a value from 1 to 3 inclusive. Each divalent organic group or ether oxygen links a siloxane chain of the copolymer to a polyarylene polyether chain of the copolymer. The groups represented by $R_1$ can be the same or different in any given siloxane unit or throughout the siloxane chain of the copolymers and the value of b in the various siloxane units in the siloxane chain of the copolymer can be the same or different. Each siloxane chain of the copolymer contains at least one unit represented by Formula (I) wherein at least one unit represented by $R_1$ is a divalent organic group or ether oxygen.

Illustrative of the monovalent hydrocarbon groups that are represented by $R_1$ in Formula 1 are the alkyl groups (for example, the methyl, ethyl, n-propyl, isopropyl, n-butyl, n-octyl, decyl, dodecyl groups), the cycloalkyl groups (for example, the cyclopropyl, cyclobutyl, cyclopentyl, cyclohexyl, cycloheptyl groups), the alkenyl groups (for example, the vinyl, allyl, crotyl, 3-butenyl, 1,3-butadienyl), the cycloalkenyl groups (for example, the cyclopentenyl, cyclohexenyl groups), the alkynyl groups (for example, the ethynyl, propargyl groups), the aryl groups (for example, the phenyl, naphthyl, phenanthrenyl), the aralkyl groups (for example, the benzyl, 2-phenylethyl, 2-phenyl propyl, cumyl groups), the alkaryl groups (for example, the tolyl, t-butylphenyl, styryl, cyclohexylphenyl groups). If desired such monovalent hydrocarbon groups can contain substituent functional groups replacing one or more of the hydrogens or carbons of the monovalent hydrocarbon moiety.

The structure of the divalent organic group represented by $R_1$ in Formula 1 is dependent upon the type of reaction involved in producing the siloxane-polyarylene polyether copolymer. The copolymers can be produced by any number of reactions thereby giving rise to a variety of divalent organic groups linking the siloxane chain to the polyarylene polyether chain of the copolymer. Typical of such reactions showing only the reactive groups on the siloxane and polyarylene polyether chains and the resulting link are the following:

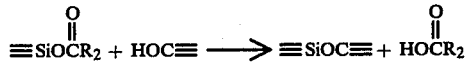

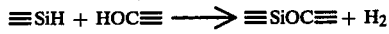

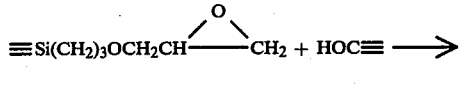

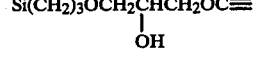

In the above equations $R_2$ represents a monovalent alkyl or aryl group, A represents a halogen atom or amino group, such as —NH$_2$, —NHB, and —NB$_2$ wherein B is a monovalent hydrocarbon radical, D represents a halogen atom, i.e. bromine, chlorine, fluorine or iodine, M is an alkali metal such as sodium or potassium, and $R_3$ is a divalent hydrocarbon radical, preferably a saturated aliphatic radical such as methylene, ethylene, propylene, n-butylene, isoamylene, hexamethylene, and the like.

In addition many other reactive groups can replace those shown in the above equations on either the siloxane or polyarylene polyether chains.

The copolymers contain siloxane units represented by Formula (1) wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, methylvinylsiloxy, bromomethyldimethylsiloxy, metaaminophenyl dimethylsiloxy and the ethylphenylvinylsiloxy groups). These copolymers can contain one or more types of siloxane units in random and/or block form that are represented by Formula (1). By way of illustration; only p-phenylene dimethylsiloxy group

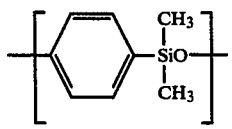

can be present in the siloxane chain or the copolymer can contain more than one type of siloxane units, e.g. the copolymer can contain both p-phenylenedimethylsiloxy units and diphenylsiloxy units, or the copolymer can contain p-phenylene dimethylsiloxy units, diphenylsiloxy units, dimethylsiloxy units, and methylvinylsiloxy units. The copolymers can contain trifunctional siloxane units (e.g. monomethylsiloxane groups, $CH_3SiO_{1.5}$) difunctional siloxane units (e.g. dimethysiloxane units, $(CH_3)_2SiO$-), monofunctional siloxane units (e.g. bromomethyl dimethylsiloxane units, $BrCH_2(CH_3)_2SiO_{0.5}$), or combinations of these types of siloxane units having the same or different substituents. According to the average functionality of the siloxane units, the siloxane chain can be predominantly linear, cyclic, branched or crosslinked or can have combinations of these structures. Preferably the siloxane chains of the copolymers are linear or predominantly linear having small amounts of branching.

In the above Formula II depicting the polyarylene polyether chain, E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such polysulfones are included within the class of polyarylene polyether resins described in, for example, U.S. Pat. No. 4,175,175, the disclosure of which is hereby incorporated herein by reference. The preferred forms of E are derived from dinuclear phenols having the structure:

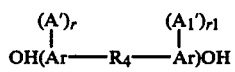

Ar is an aromatic group and preferably is a phenylene group. A' and A'$_1$ can be the same or different inert substituent groups, such as alkyl groups having from 1 to 4 carbon atoms, halogen atoms, i.e., fluorine, chloride, bromine or iodine, or alkoxy radicals having from 1 to 4 carbon atoms, r and r$_1$ are integers having a value of from 0 to 4, inclusive, and $R_4$ is representative of a bond between aromatic carbon atoms as in dihydroxydiphenyl, or is a divalent radical, including, for example, CO, O, S, S-S, $SO_2$ and divalent organic hydrocarbon radicals such as alkylene, alkylidene, cycloalkylene, or the halogen, alkyl, aryl or like substituted alkylene, alkylidene and cycloalkylene radicals as well as alkarylene and a ring fused to both Ar groups. Preferred polymers are composed of recurring units having the formula:

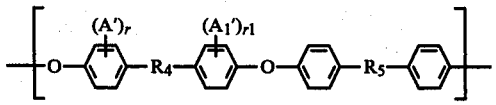

In the foregoing formula A' and A'$_1$ can be the same or different inert substituent groups as alkyl groups having from 1 to 4 carbon atoms, halogen atoms (e.g., fluorine, chlorine, bromine or iodine) or alkoxy radicals having from 1 to 4 carbon atoms, r and r$_1$ are integers having a value of from 0 to 4, inclusive. Typically, $R_4$ is representative of a bond between aromatic carbon atoms or a divalent connecting radical and $R_5$ represents sulfone, carbonyl, sulfoxide. Preferably, $R_4$ represents a bond between aromatic carbon atoms. Even more preferred are the thermoplastic polyarylene polysulfones of the above formula wherein r and r$_1$ are zero. $R_4$ is a divalent connecting radical of the formula

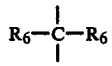

wherein $R_6$ represents a member of the group consisting of alkyl, lower aryl, and the halogen substituted groups thereof, and $R_5$ is a sulfone group.

Typical examples are the reaction products prepared from 2,2-bis-(4-hydroxyphenyl)propane (source of E residue) with 4,4'-dichlorodiphenylsulfone (source of E' residue). Other examples include products from 4,4'-dichlorodiphenylsulfone (source of E' residue) and the bisphenol of benzophenone(4,4'-dihydroxydiphenyl ketone), or the bisphenol of acetophenone[1,1-bis(4-hydroxyphenyl)ethane], or the bisphenol of vinyl cyclohexane[1-ethyl-1-(4-hydroxyphenyl)-3-4-hydroxyphebylcyclohexane)], or 4,4'-dihydroxydiphenyl sulfone or alpha, alpha'-bis(4-hydroxyphenyl)-p-diisopropylbenzene, or 4,4'-biphenol.

Typical block copolymers are prepared from a hydroxyterminated poly(aromatic ether) and bis(dialkylamino siloxanes).

SILOXANE POLYCARBONATE BLOCK COPOLYMERS

Siloxane polycarbonate block copolymers are well known in the art and described in, for example, U.S. Pat. Nos. 3,419,634 and 3,419,635.

The siloxane polycarbonate block copolymers comprise copolymers having attached by carbon-silicon linkages monovalent organosilyl radicals of the formula:

 (III)

which copolymers comprise chemically combined blocks of (A) from 1 to 95 percent by weight of organopolysiloxane comprised of chemically combined diorganosiloxy units of the formula, $$R_9SiO \qquad (IV)$$

and (B) 5 to 99 percent by weight of the reaction product of a dihydroxy compound of the formula, $$HO\ R_{10}OH \qquad (V)$$

and a member selected from a carbonyl halide and a diaryl carbonate, where $R_8$ is a hydrolyzable radical, $R_7$ is a monovalent radical free of aliphatic unsaturation selected from hydrocarbon radicals and halogenated hydrocarbon radicals, $R_9$ is selected from monovalent hydrocarbon radicals, halogenated monovalent hydrocarbon radicals and cyanoalkyl radicals, $R_{10}$ is selected from $R_{11}$ and $R_{11}$ $WR_{11}$, $R_{11}$ is selected from divalent hydrocarbon radicals and halogenated divalent hydrocarbon radicals, W is a divalent radical selected from

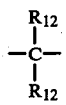

divalent cycloaliphatic radicals, divalent oxyaryleneoxy radicals, sulfonyl, sulfinyl, oxy, thio, etc. and $R_{12}$ is selected from hydrogen and $R_7$ radicals, and a is a whole number equal to 0 to 2, inclusive.

Radicals included by $R_7$ of the above formulae are monovalent aryl radicals and halogenated monovalent aryl radicals, such as phenyl, chlorophenyl, tolyl, naphthyl, etc.; aralkyl radicals such as benzyl, phenylethyl, etc., aliphatic radicals, cycloaliphatic radicals and haloaliphatic radicals, for example, methyl, ethyl, propyl, chloropropyl, trifluoropropyl, butyl, pentyl, hexyl, octyl, etc., cyclobutyl, cyclohexyl, cycloheptyl, etc. Radicals included by $R_9$ are all of the aforementioned $R_7$ radicals as well as vinyl, allyl, propenyl, etc., cyanoalkyl such as cyanoethyl, cyanopropyl, cyanobutyl, etc. Radicals included by $R_{11}$ are divalent aryl radicals and divalent halogenated aryl radicals such as phenylene, chlorophenylene, tolylene, xylylene, naphthalene, chloronaphthalene, etc., divalent alkylenearylene radicals such as ethylenephenylene, propylenetolylene, ethylenechlorophenylene, etc., alkylene such as methylene, ethylene, propylene, etc.

$R_8$ is selected from hydrolyzable radicals such as acyloxy radicals, for example, acetoxy, propionoxy. etc.; ketoximato, for example, dimethyl ketoximato, methylethyl ketoximato, etc. aminoxy, for example, diethylaminoxy, dimethylaminoxy, etc. In the above formulae, where $R_7$, $R_9$, $R_{11}$, $R_{12}$, W, $R_8$, and $R_{10}$ can represent more than one radical respectively these radicals can be all the same or any two or more of the aforementioned radicals.

The organopolysiloxane-polycarbonate block copolymers include copolymers in which the organosilyl radicals of Formula (III) are in the terminal position. These copolymers can be made by effecting addition between a silicon hydride of the formula:

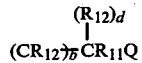 (VI)

and an organopolysiloxane-polycarbonate block copolymer having terminal olefinically unsaturated groups of the formula,

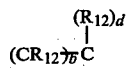 (VII)

where b can be 1 or 2, d is 0 or 1,

can be part of an unsaturated aliphatic radical such as an olefinic or acetylenic radical, or an unsaturated cycloaliphatic radical, and Q is a divalent non-polar linkage, such as —O—

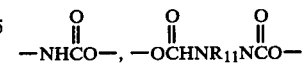

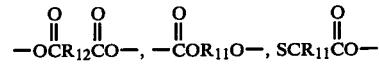

etc., where $R_7$, $R_8$, $R_{11}$, and $R_{12}$ are as defined above. These block copolymers have terminal radicals of Formula VII.

Block copolymers having terminal aliphatically unsaturated groups of Formula VII which are attached to the copolymer by carbonate linkages, can be made by phosgenating a mixture of (C) the dihydroxy compound of Formula (V), (D) an organopolysiloxane of the formula,

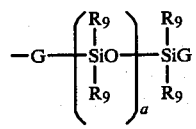 (VIII)

and (E) an aliphatically unsaturated monohydroxy compound of the formula,

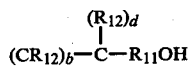 (IX)

where $R_9$, $R_{11}$, b, d, and

are defined above, G is selected from

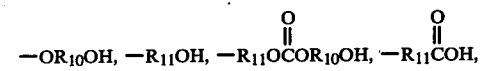

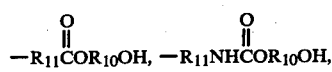

-continued

etc. where $R_{10}$ and $R_{11}$ are as previously defined, and n is an integer equal to 1 to 500, inclusive.

A method which can be employed to make the organopolysiloxane-polycarbonate block copolymers is by transesterification with diaryl carbonate and dihydroxy compounds of Formula (V). This method is described on pages 44–51 of Chemistry and Physics of Polycarbonates by Herman Schnell, Interscience Publishers, John Wiley and Sons, New York (1964). A further method which can be employed is by direct phosgenation of a mixture of dihydroxy compounds of Formula V and organopolysiloxane of Formula VIII having terminal carboxy radicals.

Isocyanates which can be employed to provide terminal olefinic unsaturation in the copolymer in place of the monohydroxy compounds of Formula VIII are olefinically unsaturated isocyanates.

The siloxane polycarbonate block copolymers may also comprise (A) copolymers having terminal monovalent aliphatically unsaturated organo radicals referred to hereinafter as the "unsaturated copolymers" and (B) copolymers having terminal radicals of the formula, $$R_{13}O \quad\quad\quad (X)$$

where $R_{13}$ is selected from hydrogen and monovalent organo radicals free of aliphatic unsaturation referred to hereinafter as the "saturated copolymers" which are composed of polycarbonate blocks chemically combined with organopolysiloxane blocks having terminal $$\begin{array}{c} R_{14} \\ | \\ -OSiR_{15}R_{16} \\ | \\ R_{14} \end{array}$$

units, where $R_{14}$ is selected from monovalent hydrocarbon radicals, and cyanoalkyl radicals, $R_{15}$ is selected from divalent hydrocarbon radicals and halogenated divalent hydrocarbon radicals, and $R_{16}$ is a divalent radical selected from

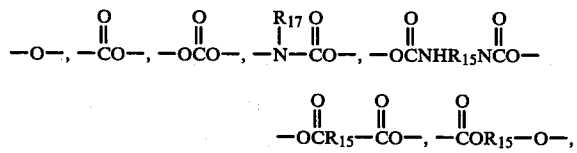

etc. where $R_{17}$ is hydrogen or an alkyl radical.

The block copolymers which signify both the unsaturated copolymers and the saturated copolymers comprise (C) from 1 to 95 percent by weight of organopolysiloxane composed of blocks comprising of chemically combined diorganosiloxy units of the formula:

$$(R_{14})_2SiO \quad\quad\quad (XI)$$

and (D) from 5 to 99 percent by weight of blocks of the reaction product of a dihydroxy compound of the formula:

$$HOR_{15}OH \quad\quad\quad (XII)$$

and a member selected from a carbonyl halide and a diaryl carbonate, where $R_{14}$ is defined above, $R_{15}$ is selected from $R_{14}$ and $R_{14}QR_{14}$ is as previously defined, Q is a divalent radical selected from $$\begin{array}{c} R_{13} \\ | \\ C \\ | \\ R_{13} \end{array}$$

divalent cycloaliphatic radicals, oxyaryleneoxy radicals, sulfonyl, sulfinyl, oxy, thio, etc. For purposes of defining the block copolymers with respect to the percent by weight of the organopolysiloxane blocks in the copolymer, based on the total weight of the copolymer, the weight of organopolysiloxane will be defined in terms of chemically combined organosiloxy units even though prior to phosgenation $OR_{15}OH$ radicals can be attached to the organopolysiloxane blocks. These siloxane polycarbonate block copolymers are prepared by methods described in, for example, U.S. Pat. No. 3,419,634.

Typical block copolymers can be prepared by reacting an α, w-dihalo terminated polysiloxane with bisphenol-A in methylene chloride/pyridine solution. Additional bisphenol-A is added, and the mixture phosgenated until the desired block copolymer is obtained.

The preferred amount of siloxane in the two block polymers in greater than or equal to 50 weight percent. The modulus of the impact modifier is ≦100,000 psi.

POLYESTERS

The polyesters which are suitable for use herein are derived from an aliphatic or cycloaliphatic diol, or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

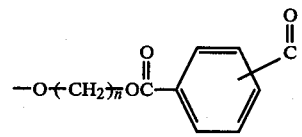

wherein n is an integer of from 2 to 4.

The preferred polyester is poly(ethylene terephthalate).

Also contemplated herein are the above polyesters with minor amounts, e.g., from 0.5 to about 2 percent by weight, of units derived from aliphatic acids and/or aliphatic polyols, to form copolyesters. The aliphatic polyols include glycols such as poly(ethylene glycol). These can be made following the teachings of, for example, U.S. Pat. Nos. 2,465,319 and 3,047,539.

Among the units which can be present in the copolyesters are those derived from aliphatic dicarboxylic acids, e.g., of up to about 50 carbon atoms, including cycloaliphatic straight and branched diacids, such as adipic acid, cyclohexanediacetic acid, dimerized $C_{16}$–$C_{18}$ unsaturated acids (which have 32 to 36 carbon atoms), trimerized acids, and the like. In addition, there can be minor amounts of units derived from aliphatic glycols and polyols, e.g., of up to about 50 carbon atoms preferably from 2 to about 20 carbon atoms and these include, among others, propylene glycol, glycerol, diethylene glycol, triethylene glycol and the like.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid so as to produce a polyester having recurring units having the following formula:

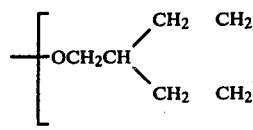

(XIII)

wherein the cyclohexane ring is selected from the cis- and trans-isomers thereof and $R_{16}$ represents an aryl radical containing 6 to 20 carbon atoms and which is the decarboxylated residue derived from an aromatic dicarboxylic acid.

Examples of aromatic dicarboxylic acids indicated by $R_{16}$ in formula XIII, include isophthalic or terephthalic acid, Another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

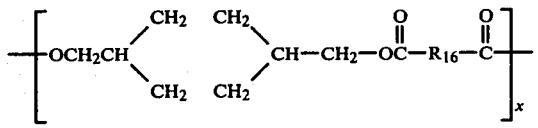 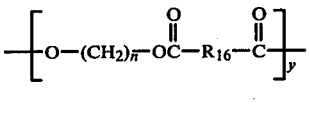

wherein the cyclohexane ring is selected from the cis- and trans-isomers thereof, $R_{16}$ is as previously defined, n is an integer of 2 to 4, he x units comprise from about 10 to about 90 percent by weight and the y units comprise from about 10 to 90 percent by weight.

The preferred copolyester may be derived from the reaction of either the cis- or trans-isomer (or mixtures thereof) of 1,4-cylohexanedimethanol and ethylene glycol with terephthalic acid in a molar ratio of 1:2:3. These copolyesters have repeating units of the following formula:

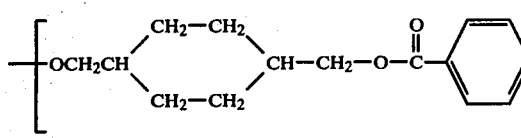 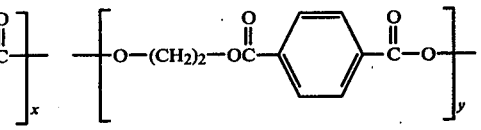

wherein x and y are previously defined.

The polyesters as described herein are either commercially available or can be produced by methods well known in weight.

The preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

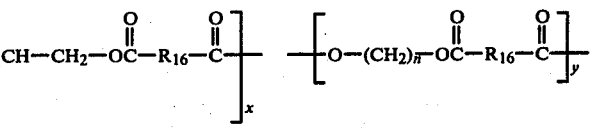

wherein x and y are previously defined.

The polyesters as described herein are either commercially available or can be produced by methods well known in the art such as those set forth in, for example, U.S. Pat. No. 2,901,466.

The preferred polyesters are poly(ethylene terephthalate), poly(1,4-cyclohexane dimethanol tere/isophthalate) and a copolyester of 1,4-cyclohexanedimethanol, ethylene glycol and terephthalic acid.

The polyesters used herein have an intrinsic viscoisty of at least about 0.4 to about 2.0 dl/g. measured in a 60:40 phenol/tetrachloroethane mixture of similar solvent at 23°–30° C.

The composition of this invention contains from about 1 to about 99 and preferably, from about 25 to about 95 percent by weight of polyarylate, from about 1 to about 25 and preferably, from about 5 to about 15 percent by weight of the siloxane-polyarylene block copolymer and/or the siloxane polycarbonate block copolymer, and when used, from about 5 to about 80 and preferably, from about 10 to about 60 percent by weight of polyester.

The compositions of this invention are prepared by any conventional mixing methods. For example, a preferred method comprises mixing the polyarylate, siloxane polyarylene block copolymer and/or the siloxane polycarbonate block copolymer, and optionally polyester, in powder or granular form in an extruder and extruding the mixture into strands, chopping the strands into pellets and molding the pellets into the desired article.

It should, of course, be obvious to those skilled in the art that other additives may be included in the present compositions. These additives include plasticizers, pigments; flame retardant additives, reinforcing agents, such as glass fibers; thermal stabilizers; and the like.

Also, the compositions of this invention may include at least one thermoplastic polymer selected from an aromatic polycarbonate, a styrene resin, an alkyl acrylate resin, a polyurethane, a vinyl chloride polymer, a poly(aryl ether), a copolyetherester block polymer, a polyhydroxyether or a polyamide.

EXAMPLES

The following examples serve to give specific illustrations of the practice of this invention but they are not intended in any way to limit the scope of this invention.

Control A

A polyarylate (Ardel D-100, sold by Union Carbide Corporation and prepared from bisphenol-A and a mixture of 50 mole percent each of terephthalic and isophthalic acid chlorides, by conventional methods) having a reduced viscosity of 0.66 as measured in p-chlorophenol at 49° C. (0.2 g/100 ml.) was injection molded into ASTM specimens (at 340°–360° C.) using a Newburg 1¼ ounce screw injection molding machine. The test specimens were measured for notched izod impact strength according to ASTM D-256.

The results shown in Table I.

EXAMPLE 1

95 weight percent of the polyarylate described in Control A was blended with 5 weight percent of a bisphenol A polycarbonate/poly(dimethylsiloxane) block copolymer having a reduced viscosity of 1.14 dl/g as measured in methylene chloride (0.5 g/100 ml. at 25° C.).

This blend was prepared by extrusion blending the components at about 270° C. in a single screw 1-inch diameter extruder with L/D=36/1. The extrudate was chopped into pellets. The pelletized product was then injection molded into ASTM test specimens and tested as described in Control A.

The results are shown in Table I.

EXAMPLE 2

90 weight percent of the polyarylate described in Control A was blended with 10 weight percent of the block copolymer described in Example 1 in an extruder by the procedure described in Example 1. The extrudate was chopped into pellets, molded into test bars and tested by the procedure described in Control A.

The results are shown in Table I.

EXAMPLE 3

95 weight percent of the polyarylate described in Control A was blended with 5 weight percent of a block copolymer of polysulfone and poly(dimethyl siloxane) having a reduced viscosity of 0.8 dl/g as measured in tetrahydrofuran at 25° C. (0.2 g/100 ml.) made of 5000 molecular weight blocks and containing 50 percent polysulfone by weight in an extruder by the procedure described in Example 1. The extrudate was chopped into pellets, molded into test bars and tested as described in Control A.

The results are shown in Table I.

Control B 40 weight percent of poly(ethylene terephthalate) having an intrinsic viscosity of 0.64 as measured in 60:40 phenol/tetrachloroethane mixture at 23° C. was blended with 60 weight percent of the polyarylate described in Control A in an extruder by the procedure described in Example 1. The extrudate was chopped into pellets, molded into test bars and tested by the procedure described in Control A.

The results are shown in Table I.

EXAMPLE 4

95 weight percent of the blend of poly(ethylene terephthalate) and polyarylate of Control B was blended with 5 weight percent of the block copolymer of polysulfone and poly(dimethyl siloxane) of Example 3 in an extruder by the procedure described in Example 1. The extrudate was chopped into pellets, molded into test bars and tested by the procedure described in Control A.

The results are shown in Table I.

EXAMPLE 5

90 weight percent of the blend of poly(ethylene terephthalate) and polyarylate of Control B was blended with 5 weight percent of the block copolymer of polysulfone and poly(dimethyl siloxane) of Example 3 in an extruder by the procedure described in Example 1. The extrudate was chopped into pellets, molded into test bars and tested by the procedure described in Control A.

The results are shown in Table I.

EXAMPLE 6

95 weight percent of the blend of poly(ethylene terephthalate) and polyarylate of Control B was blended with 5 weight percent of the bisphenol A polycarbonate/poly(dimethylsiloxane) block copolymer described in Example 1 in an extruder by the procedure described in Example 1. The extrudate was chopped into pellets, molded into test bars and tested by the procedure described in Control A.

The results are shown in Table I.

Control C 20 weight percent of the poly(ethylene terephthate) described in Control B was blended with 80 weight percent of the polyarylate described in Control A in an extruder by the procedure described in Example 1. The extrudate was chopped into pellets, molded into test bars and tested by the procedure described in Control A.

The results are shown in Table I.

EXAMPLE 7

95 weight percent of the blend of poly(ethylene terephthalate) and polyarylate of Control C was blended with 5 weight percent of the block copolymer of polysulfone and poly(dimethyl siloxane) described in Example 3 in an extruder by the procedure described in Example 1. The extrudate was chopped into pellets, molded into test bars and tested by the procedure described in Control A.

The results are shown in Table I.

EXAMPLE 8

95 weight percent of the blend of poly(ethylene terephthalate) and polyarylate of Control C was blended with 5 weight percent of the bisphenol A polycarbonate poly(dimethylsiloxane) block copolymer described in Example 1 in an extruder by the procedure described in Example 1. The extrudate was chopped into pellets, molded into test bars and tested by the procedure described in Control A.

The results are shown in Table I.

EXAMPLE 9

90 weight percent of the blend of poly(ethylene terephthalate) and polyarylate of Control C was blended with 10 weight percent of the bisphenol A polycarbonate poly(dimethylsiloxane) block copolymer described in Example 1 in an extruder by the procedure described in Example 1. The extrudate was chopped into pellets, molded into test bars and tested by the procedure described in Control A.

The results are shown in Table I.

The results show that only modest improvements in notched toughness are observed with polyester addition. With the polyester addition, a significant increase in notched toughness is observed with addition of the silicone block copolymer.

TABLE I

| Example | Polymer¹ | (wt. %) | Additive² | (wt. %) | Notched Izod Impact Strength (Ft.-lbs./in of notch) |
|---|---|---|---|---|---|
| Control A | PA | 100 | — | — | 4.2 |
| 1 | PA | 95 | PC/DMS | 5 | 5.1 |
| 2 | PA | 10 | PC/DMS | 10 | 5.3 |
| 3 | PA | 95 | PS/DMS | 5 | 4.9 |
| Control B | PET (40) PA (60) | 100 | — | — | 1.3 |
| 4 | PET (40) PA (60) | 95 | PS/DMS | 5 | 3.1 |
| 5 | PET (40) PA (60) | 90 | PS/DMS | 10 | 10.4 |
| 6 | PET (40) PA (60) | 95 | PC/DMS | 5 | 2.6 |
| Control C | PET (20) PA (80) | 100 | — | — | 2.6 |
| 7 | PET (20) PA (80) | 95 | PS/DMS | 5 | 9.4 |
| 8 | PET (20) PA (80) | 95 | PC/DMS | 5 | 9.9 |
| 9 | PET (20) PA (80) | 90 | PC/DMS | 10 | 9.6 |

¹PA = polyarylate
PET = poly(ethylene terephthalate)

What is claimed is:

1. A thermoplastic molding composition having improved notched izod impact values after molding, said composition comprising in admixture:
   (a) a polyarylate derived from a dihydric phenol and an aromatic dicarboxylic acid; and
   (b) a siloxane-polyarylene polyether block copolymer and/or a siloxane polycarbonate block copolymer.

2. A composition as defined in claim 1 wherein said polyarylate is derived from a dihydric phenol or a mixture of dihydric phenols, said dihydric phenol having the following formula:

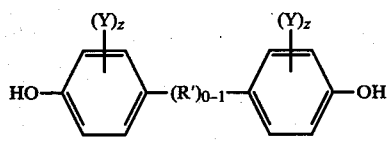

wherein Y is selected from alkyl groups of 1 to 4 carbon atoms, chlorine or bromine, z has a value of 0 to 4, inclusive and R' is a divalent saturated aliphatic hydrocarbon radical having from 1 to 3 carbon atoms and a cycloalkylene radical having up to and including 9 carbon atoms and a dicarboxylic acid.

3. A composition of defined in claim 2 wherein the dihydric phenol is used in combination with a dihydric phenol of the following formula:

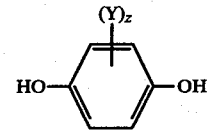

wherein Y is selected from alkyl groups of 1 to 4 carbon atoms, chlorine or bromine and z has a value of 0 to 4.

4. A composition as defined in claim 2 wherein the polyarylate is derived from bisphenol-A and an aromatic-dicarboxylic acid.

5. A composition as defined in claim 1 wherein the polyarylate is derived from a dihydric phenol and isophthalic acid.

6. A composition as defined in claim 1 wherein the polyarylate is derived from a dihydric phenol and a mixture of isophthalic acid and terephthalic acid.

7. A composition as defined in claim 1 wherein the polyarylate is present in amounts of from about 1 to about 99 weight percent.

8. A composition as defined in claim 7 wherein the polyarylate is present in amounts of from about 25 to about 95 weight percent.

9. A composition as defined in claim 1 wherein the siloxane-polyarylene polyether block copolymer is a poly(dimethylsiloxane)-polysulfone block copolymer.

10. A composition as defined in claim 1 wherein the siloxane-polycarbonate block copolymer is a poly(dimethylsiloxane)-bisphenol A polycarbonate block copolymer.

11. A composition as defined in claim 1 wherein the siloxane-polyarylene polyether block copolymers and/or siloxane polycarbonate block copolymer is present in amounts of from about 1 to about 25 weight percent.

12. A composition as defined in claim 1 which contains a polyester.

13. A composition as defined in claim 12 wherein said polyester is derived from an aliphatic diol and an aromatic dicarboxylic acid and has repeating units of the general formula:

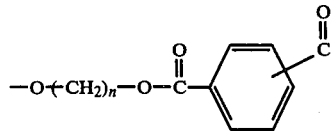

wherein n is a whole number of from 2 to 4.

14. A composition as defined in claims 12 or 13 wherein the polyester is poly(ethylene terephthalate).

15. A composition as defined in claim 12, wherein the polyester is poly(1,4-cyclohexanedimethanol tere/isophthalate).

16. A composition as defined in claim 12, wherein the polyester is a copolyester of 1,4-cyclohexanedimethanol, ethylene glycol and terephthalic acid.

17. A composition as defined in claim 12 wherein the polyester is present in amounts of from about 5 to about 80 weight percent.

18. A composition as defined in claims 17 wherein the polyester is present in amounts of from about 10 to about 60 weight percent.

19. A composition as defined in claims 1 or 12 which contains one or more thermoplastic polymers selected from the group consisting of an aromatic polycarbonate, a styrene resin, an alkyl acrylate resin, a polyurethane, a vinyl chloride polymer, a poly(aryl ether), a copolyetherester block copolymer, a polyhydroxyether, or a polyamide.

* * * * *